(12) United States Patent
Yuan (10) Patent No.: US 11,211,097 B2
(45) Date of Patent: Dec. 28, 2021

(54) GENERATING METHOD AND PLAYING METHOD OF MULTIMEDIA FILE, MULTIMEDIA FILE GENERATION APPARATUS AND MULTIMEDIA FILE PLAYBACK APPARATUS

(71) Applicant: Acer Incorporated, New Taipei (TW)

(72) Inventor: Chia-Shang Yuan, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/532,511

(22) Filed: Aug. 6, 2019

(65) Prior Publication Data
US 2020/0051594 A1 Feb. 13, 2020

(30) Foreign Application Priority Data

Aug. 7, 2018 (TW) .................................. 107127500

(51) Int. Cl.
*G11B 27/10* (2006.01)
(52) U.S. Cl.
CPC .................... *G11B 27/10* (2013.01)
(58) Field of Classification Search
CPC ....................................................... G11B 27/10
See application file for complete search history.

(56) References Cited

U.S. PATENT DOCUMENTS

| 9,620,168 B1 | 4/2017 | Townsend et al. |
| 2008/0294691 A1* | 11/2008 | Chang ................. G06F 16/4393 |
| 2012/0045149 A1* | 2/2012 | Arai ....................... H04N 7/183 |
| | | 382/296 |
| 2016/0132991 A1* | 5/2016 | Fukushi ................... G06T 3/40 |
| | | 345/667 |
| 2017/0195576 A1 | 7/2017 | Desai et al. |
| 2018/0367777 A1* | 12/2018 | Li ............................. G01S 3/00 |

FOREIGN PATENT DOCUMENTS

TW 201738649 11/2017

* cited by examiner

*Primary Examiner* — Girumsew Wendmagegn
(74) *Attorney, Agent, or Firm* — JCIPRNET (57) ABSTRACT

A generating method and a playing method of multimedia file, a multimedia file generation apparatus and a multimedia file playback apparatus are provided. The playing method of multimedia file includes following steps. A multimedia file including a panoramic video associated with a timeline is received. A first data track of the multimedia file is extracted to obtain object positions of the first image object in the panoramic video with respect to the timeline. When playing the panoramic video, an icon corresponding to the first image object is displayed in a display frame of a screen. In response to detecting a selection operation performed on the icon, a field of view (FoV) for playing the panoramic video is determined according to a first object position recorded in the first data track, and display frames including the first image object are played based on the determined FoV.

16 Claims, 7 Drawing Sheets

FIG. 8B

GENERATING METHOD AND PLAYING METHOD OF MULTIMEDIA FILE, MULTIMEDIA FILE GENERATION APPARATUS AND MULTIMEDIA FILE PLAYBACK APPARATUS

CROSS-REFERENCE TO RELATED APPLICATION

This application claims the priority benefit of Taiwan application serial no. 107127500, filed on Aug. 7, 2018. The entirety of the above-mentioned patent application is hereby incorporated by reference herein and made a part of this specification.

BACKGROUND

Technical Field

The disclosure relates to a video playback technic, particularly to a generating method and a playing method of multimedia file, a multimedia file generation apparatus and a multimedia file playback apparatus.

Related Art

A panorama camera and a 360-degree panorama video are getting popular in these days, and the user can view the 360-degree panorama video (also called as a panorama video) by using a computer monitor. Through capturing a plurality of images using a plurality lens according to the different photographing angle and performing image stitching processing, the 360-degree panorama video is able to be produce, which can provide the user with an immersive effect.

Actually, the user can merely view part of content of the 360-degree scene when the user views the 360-degree panorama video by using the computer monitor. The user may need to adjust the field of view (FOV) for playing the 360-degree panorama video so as to see the different corners in the 360-degree scene. Therefore, the user may need to manually adjust the FOV to search an object of interest, which greatly reduces the convenience in viewing a 360-degree panorama video. In addition, since the performance of general consumer electronics is limited, it is hard for the general consumer electronics to perform image object recognition and image object tracking on the 360-degree panorama video in real-time. Hence, the user may need to manually adjust the FOV frequently in response to movement of the object of interest when the user only wants to view a specific object of interest.

SUMMARY

In view of the above, embodiments of the disclosure propose a generating method of multimedia file and a multimedia file generation apparatus, which can generate a multimedia file including a 360-degree panorama video and recording position information of the image object by establishing a specific data track for the multimedia file based on the position information of the image object.

Further, embodiments of the disclosure propose a playing method of multimedia file and a multimedia file playback apparatus, which can obtain position information of the image object from the specific data track of the multimedia file so as to dynamically adjust the view angle according to the position information of the image object interested by the user.

In one embodiment of the disclosure, a generating method of multimedia file is provided and is applicable to a multimedia file generation apparatus, and the method includes following steps. A panorama video associated with a timeline is obtained, wherein the panorama video includes at least one image object. A plurality of object positions of the at least one image object are obtained, and the object positions are corresponding to the timeline. The object positions are manufactured into an object position file. At least one data track of a multimedia file is generated according to the object position file to produce the multimedia file including the panorama video and recording the object positions.

In one embodiment of the disclosure, a multimedia file generation apparatus including a storage device and a processor is provided. The storage device records a plurality of modules, and the processor is coupled to the storage device and is configured to execute the modules. The modules include an video obtaining module, a position obtaining module, a file generation module and a file embedding module. The video obtaining module obtains a panorama video associated with a timeline, wherein the panorama video comprises at least one image object. The position obtaining module obtains a plurality of object positions of the at least one image object corresponding to the timeline. The file generation module manufactures the object positions into an object position file. The file embedding module generates at least one data track of a multimedia file according to the object position file to produce the multimedia file including the panorama video and recording the object positions.

In one embodiment of the disclosure, a playing method of multimedia file is provided and is applicable to a multimedia file playback apparatus, and the method includes following steps. A multimedia file including a panorama video associated with a timeline is received. A first data track of the multimedia file is extracted to obtain a plurality of first object positions of a first image object corresponding to the timeline. An icon of the first image object is displayed in frames displayed by the screen when playing the panorama video. In response to detecting a selection operation performed on the icon, a field of view (FOV) for playing the panorama video is determined according to the first object positions recorded by the first data track, and the frames including the first image object is played based on the determined FOV.

In one embodiment of the disclosure, a multimedia file playback apparatus including a screen, a storage device and a processor is provided. The storage device records a plurality of modules, and the processor is coupled to the screen and the storage device and is configured to execute the modules. The modules include a video receiving module, a data track extracting module, an interface providing module and a video playback module. The video receiving module receives a multimedia file including a panorama video associated with a timeline. The data track extracting module extracts a first data track of the multimedia file to obtain a plurality of first object positions of a first image object corresponding to the timeline. The interface providing module displays an icon of the first image object in frames displayed by the screen when playing the panorama video. In response to detecting a selection operation performed on the icon, the video playback module determines a FOV for playing the panorama video according to the first object positions recorded by the first data track and plays the frames including the first image object based on the determined FOV.

Based on the above, the multimedia file generation apparatus may establish a specific data track of the multimedia file according to the object positions of the image objects shown in the panorama video. Hence, the multimedia file playback apparatus may obtain the object positions of the image objects located in the panorama video from the specific data track of the multimedia file when playing the panorama video, and thus the FOV can be dynamically determined according to the object positions of the image objects. Such that, the user does not need to adjust the FOV for playing the panorama video frequently, but the specific image object in the panorama video still can be aimed for be viewed by the user.

To make the above features and advantages of the disclosure more comprehensible, several embodiments accompanied with drawings are described in detail as follows.

DETAILED DESCRIPTION OF DISCLOSED EMBODIMENTS

Some embodiments of the disclosure will be hereinafter described in detail with reference to the accompanying drawings. In the following description, the same reference numerals in different drawings represent the same or similar elements. These embodiments are only a part of the disclosure and do not disclose all of the possible implementations of the disclosure.

Figure 1:
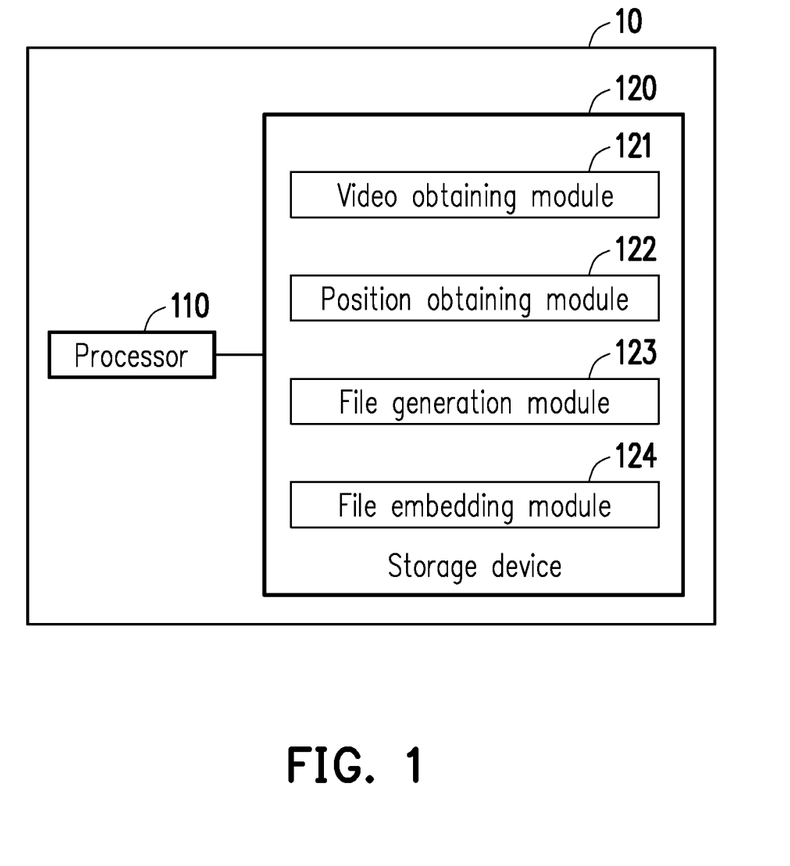
FIG. 1 is a block diagram illustrating a multimedia file generation apparatus according to one embodiment of the disclosure.

FIG. 1 is a block diagram illustrating a multimedia file generation apparatus according to one embodiment of the disclosure. It should, however, be noted that this is merely an illustrative example and the disclosure is not limited in this regard. All components of the multimedia file generation apparatus and their configurations are first introduced in FIG. 1. The functionalities of the components are disclosed with FIG. 2 in more detail in the subsequent embodiments.

Please referring to FIG. 1, the multimedia file generation apparatus 10 may be any electronic apparatus having computing capability, such as a desk computer, a notebook computer, a server and so on, which is not limited in the disclosure. The multimedia file generation apparatus 10 includes a processor 110 and a storage device 120, and the functionalities of the processor 110 and the storage device 120 are described below.

The storage device 120 is, for example, a fixed or movable random access memory (RAM) in any form, a read-only memory (ROM), a flash memory, a hard disc, other similar devices, or a combination of these devices. In the present embodiment, the storage device 120 is configured to record a video obtaining module 121, a position obtaining module 122, a file generating module 123 and a file embedding module 124.

The processor 110 is coupled to the storage device 120 and would be configured to execute the proposed generating method, and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices, a combination of above-mentioned devices or integrated circuits.

In the present embodiment, the modules recorded in the storage device 120 may be, for example, computer program and are able to be accessed by the processor 110, such that the proposed generating method of multimedia file can be implemented accordingly.

Figure 2:
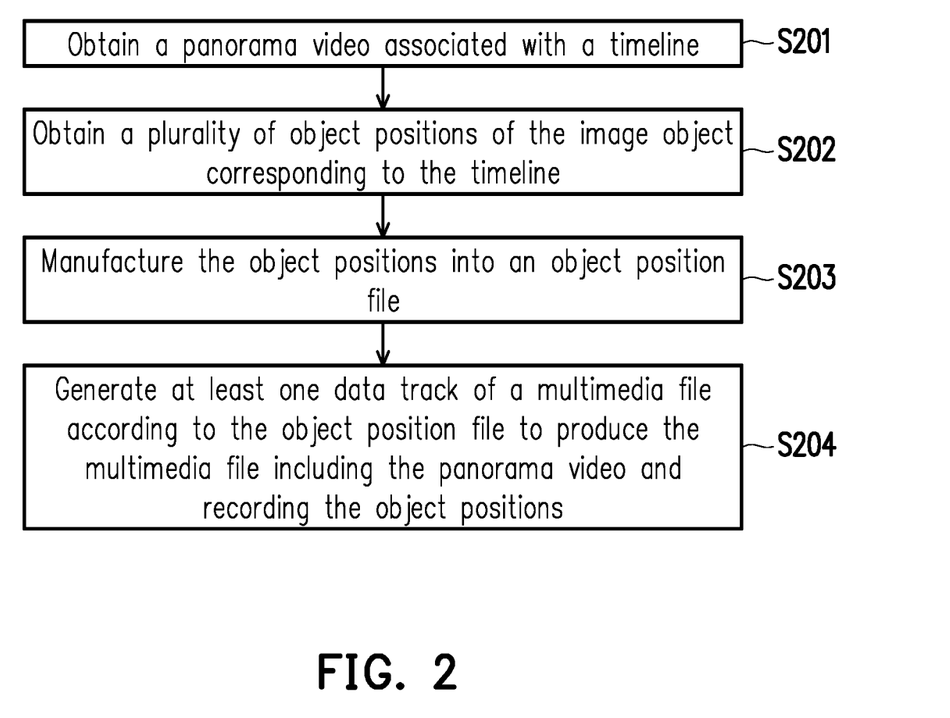
FIG. 2 is a flowchart illustrating a generating method of a multimedia file according to an embodiment of the disclosure.

FIG. 2 is a flowchart illustrating a generating method of multimedia file according to an embodiment of the disclosure, where the flow in FIG. 2 may be implemented by the multimedia file generation apparatus 10 in FIG. 1. Referring to both FIG. 1 and FIG. 2, detailed steps of the generating method of multimedia file in this embodiment is described with reference to the components in the multimedia file generation apparatus 10 as follows.

In step S201, the video obtaining module 121 may obtain a panorama video associated with a timeline, wherein the panorama video comprises at least one image object. Herein, the video obtaining module 121 may obtain the panorama video from an image capturing module (not shown) of the multimedia file generation apparatus 10 or from the other electronic devices. The panorama video composed of video frames corresponding to different time stamps on the timeline may be called as 360-degree panorama video as well, and the video frames are 360-degree images stored in a specific format. The specific format is, for example, Equiangular format, etc. It should be noted that, in the embodiments of the disclosure, the panorama video includes at least one image object generated by photographing at least one real object. That is, the image object is shown in the video frames of the panorama vide. The image object in the panorama video may be human face, for example, or may be other kinds of image objects. The disclosure is not limited in this regard.

In the step S202, the position obtaining module 122 obtains a plurality of object positions of the at least one image object corresponding to the timeline. In one embodiment, the object positions of the image object may be generated through viewing via human eyes and then manually editing by a video editor. Namely, through viewing the panorama video via human eyes and then manually marking up the object positions of the image object by the video editor, the position obtaining module 122 may obtain a plurality of object positions of the image object in a stereo coordinate system. Alternatively, in one embodiment, the object positions of the image object may be generated automatically through image object detection and recognition algorithms of image processing technique. In other words, through tracking the image object by using image object detection and recognition algorithms, the position obtaining module 122 may obtain a plurality of object positions of the image object in the stereo coordinate system respectively within different time zones. The object positions of the image object may be a spherical coordinates of a spherical coordinate system, for example.

Figure 3A:
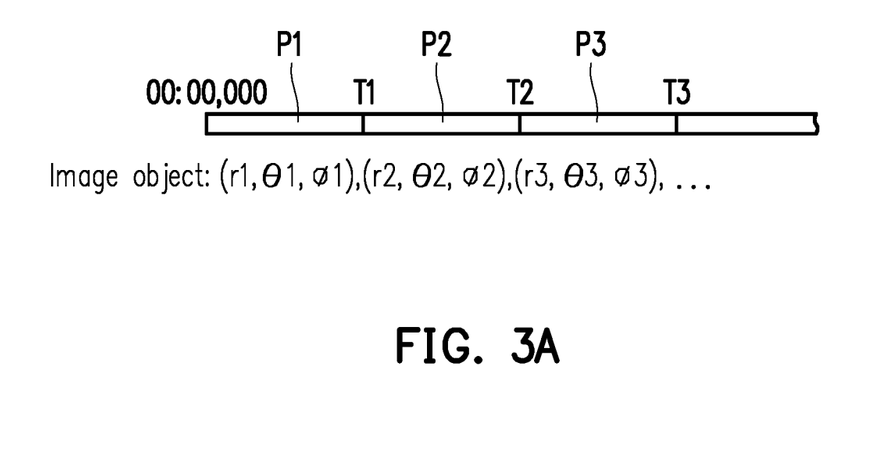
FIG. 3A and FIG. 3B are schematic diagrams illustrating a plurality of object positions corresponding to a plurality of time zones according to one embodiment of the disclosure.

In one embodiment, the object positions of the image object respectively correspond to a plurality of time zones on the timeline. That is, the object positions of the image object may be sampled according to fixed or unfixed time intervals. Please referring to FIG. 3A, FIG. 3A is s schematic diagram illustrating a plurality of object positions corresponding to a plurality of time zones according to one embodiment of the disclosure. For one image object, the position obtaining module 122 may obtain the object position (r1, θ1, φ1) corresponding to the time interval P1, the object position (r2, θ2, φ2) corresponding to the time interval P2, and the object position (r3, θ3, φ3) corresponding to the time interval P3. It should be noted that, the time length of the time interval P1-P3 may be the same or different with each other. The disclosure is not limited in this regard.

Figure 3B:
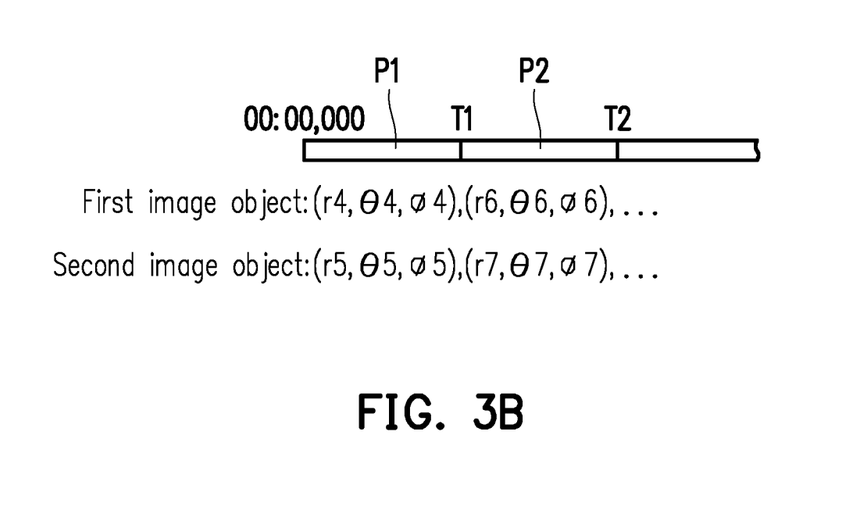

In addition, in one embodiment, the number of the panorama video may be two or more than two. For instance, at least one of the image object in the panorama video may include a first image object and a second image object. Accordingly, the object positions corresponding to the timeline may include a plurality of first object positions of the first image object and a plurality of seconds object position of the second image object. Please referring to FIG. 3B, FIG. 3B is a schematic diagram illustrating a plurality of object positions corresponding to a plurality of time zones according to one embodiment of the disclosure. For the first image object, the position obtaining module 122 may obtain the object position (r4, θ4, φ4) corresponding to the time interval P1 and the object position (r5, θ5, φ5) corresponding to the time interval P2. For the second image object, the position obtaining module 122 may obtain the object position (r6, θ6, φ6) corresponding to the time interval P1 and the object position (r7, θ7, φ7) corresponding to the time interval P2.

Figure 4:
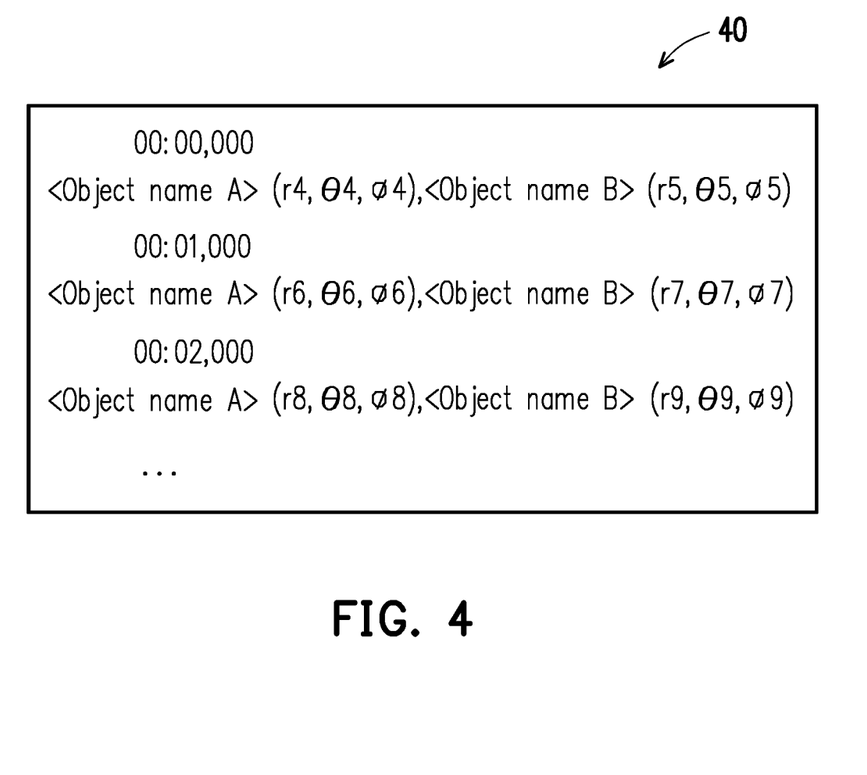
FIG. 4 is a schematic diagram illustrating an example of an object position file according to one embodiment of the disclosure.

Next, return to the flow in FIG. 2, in step S203, the file generating module 123 may manufacture the object positions into an object position file. The file generating module 123 may compile the object positions respectively corresponding to the time zones on the timeline as an object position file by a predetermined file format. In one embodiment, the manner of generating the object position file may be similarly with the manner of generating a video subtitle file. Please referring to FIG. 4, FIG. 4 is a schematic diagram illustrating an example of an object position file according to one embodiment of the disclosure. The object position file 40 records the object positions of the two image objects respectively named as "Object name A" and "Object name B" in the panorama video, and the object positions is recorded by using the fixed time interval. The time interval is 1 second (sec) as example in FIG. 4, but the disclosure is not limited in this regard. For example, at time point 00:01.000, the object position of the image object named as "Object name A" is (r6, θ6, φ6), and the object position of the image object named as "Object name B" is (r7, θ7, φ7). At time point 00:02.000, the object position of the image object named as "Object name A" is (r8, θ8, φ8), and the object position of the image object named as "Object name B" is (r9, θ9, φ9).

In addition, in one embodiment, the file generating module 123 may map the object positions recorded as a plurality of stereo position coordinates into a plurality of two-dimension position coordinates, and thus record the two-dimension position coordinates in the object position file. Generally, the video frames in the panorama video are stored by mapping the panorama images into two-dimension images, such as storing the panorama video by Equiangular format. The object positions recorded as the stereo position coordinates (e.g. spherical coordinates) may be mapped into the two-dimension position coordinates in the two-dimension coordinate system and be stored accordingly, such that the data amount of the object position file may be reduced.

Figure 5:
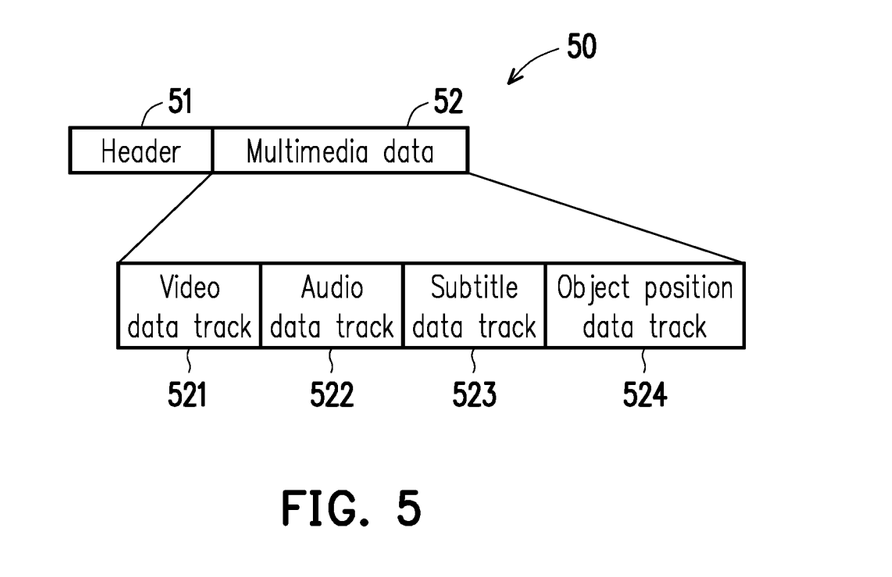
FIG. 5 is a schematic diagram illustrating a structure of a multimedia file according to one embodiment of the disclosure.

Afterward, in step S204, the file embedding module 124 may generate at least one data track of a multimedia file according to the object position file to produce the multimedia file including the panorama video and recording the object positions. FIG. 5 is a schematic diagram illustrating a structure of a multimedia file according to one embodiment of the disclosure. The multimedia file 50 includes a header 50 and multimedia data 52, and the multimedia data 52 includes multimedia data which may be classified into a plurality of data tracks. Namely, the multimedia file 50 may include a plurality of data tracks. The header 51 records description of the data tracks and the number of the data tracks, and the data tracks may include a video data track 521, an audio data track, a subtitle data track 523 and an object position data track 524. The video data track is configured for classifying the video data; the audio data track is configured for classifying the audio data, and the different audio data tracks may refer to different languages; the subtitle data track is configured for classifying the subtitle data, and the different subtitle data tracks may refer to different languages.

In one embodiment, when the object position file includes the first object positions of the first image object and the second object positions of the second image object (such as the example shown in FIG. 4), the file embedding module 124 may generate a first data track corresponding to the first image object and embed the first object positions (such as (r4, θ4, φ4), (r6, θ6, φ6), (r6, θ6, φ6) shown in FIG. 4) in the object position file into a first data track. On the other hand, the file embedding module 124 may generate a second data track corresponding to the second image object and embed the second object positions (such as (r5, θ5, φ5), (r7, θ7, φ7), (r9, θ9, φ9) shown in FIG. 4) in the object position file into a second data track. That is, the number of the object position data tracks is determined according to the number of the image objects, and the object positions of each image object are recorded by the corresponding object position data track. Namely, the different object position data tracks may refer to the position information of the different image objects.

It should be noted that, compared with the conventional multimedia file, the multimedia file 50 further includes the object position data track 524 configured for recording the object positions. The file embedding module 124 may establish at least one data track (i.e. the object position data track 524) of the multimedia file 50 according to the object position file. For example, in FIG. 4, the data in the object position file 40 is embedded into the object position data track 524 of the multimedia file 50. Herein, embedding the data into at least one data track of the multimedia file 50 refers as embedding the data into the data block of the at least one data track of the multimedia file 50. Further, the header 51 further records description of the at least one object position data track and the number of the at least one object position data track. Such that, the player for playing the multimedia file 50 not only may play the panorama video of the multimedia file 50 but also may obtain the position information of the image objects located in the panorama video.

After describing how to generate a multimedia file recording the object positions of the image objects located in the panorama video, the following embodiments are provided to describe how to play the panorama video according to the multimedia file in the disclosure.

Figure 6:
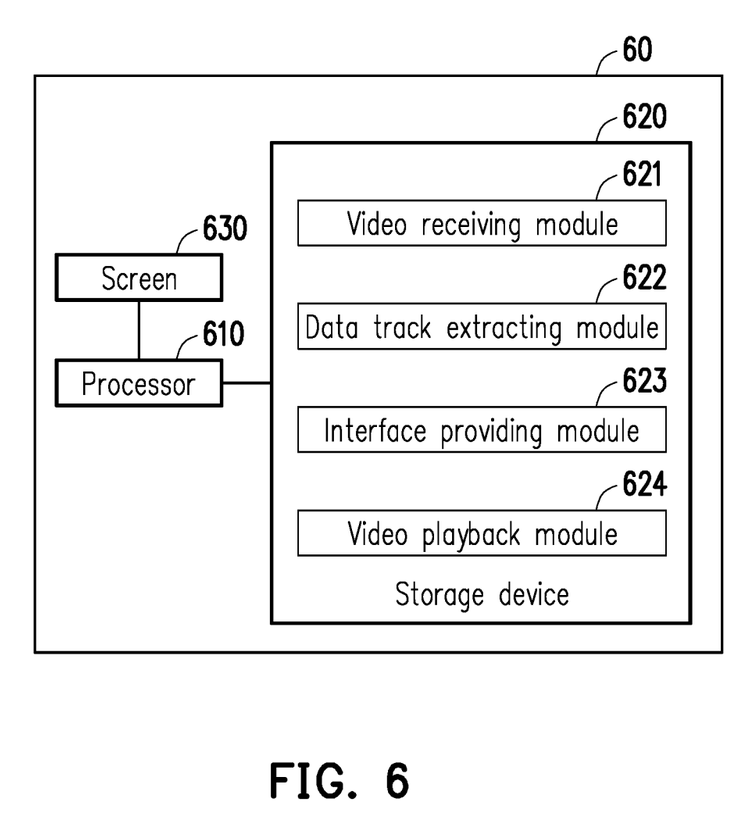
FIG. 6 is a block diagram illustrating a multimedia file playback apparatus according to one embodiment of the disclosure.

FIG. 6 is a block diagram illustrating a multimedia file playback apparatus according to one embodiment of the disclosure. It should, however, be noted that this is merely an illustrative example and the disclosure is not limited in this regard. All components of the multimedia file playback apparatus and their configurations are first introduced in FIG. 6. The functionalities of the components are disclosed with FIG. 7 in more detail in the subsequent embodiments.

Please referring to FIG. 6, the multimedia file playback apparatus 60 may be any electronic apparatus having computing capability and displaying capability, such as a desk computer, a notebook computer, a smart phone, a tablet and so on, which is not limited in the disclosure. The multimedia file playback apparatus 60 includes a processor 610, a storage device 620 and a screen 630.

The storage device 620 is, for example, a fixed or movable random access memory (RAM) in any form, a read-only memory (ROM), a flash memory, a hard disc, other similar devices, or a combination of these devices. In the present embodiment, the storage device 620 is configured to record a video receiving module 621, a data track extracting module 622, an interface providing module 623 and a video playback module 624. In one embodiment, the above module may be implemented by a software player.

The processor 610 is coupled to the storage device 620 and would be configured to execute the proposed playing method, and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices, a combination of above-mentioned devices or integrated circuits.

The screen 630 is configured to display the frames outputted by the multimedia file playback apparatus 60 for user. In the embodiment, the multimedia file playback apparatus 60 may be, for example, a liquid crystal display (LCD), a light-emitting diode (LED) display, a field Emission display (FED) or other kinds of the displays.

In the present embodiment, the modules recorded in the storage device 620 may be computer program for example and are able to be accessed by the processor 610, such that the proposed playing method of multimedia file can be implemented accordingly.

Figure 7:
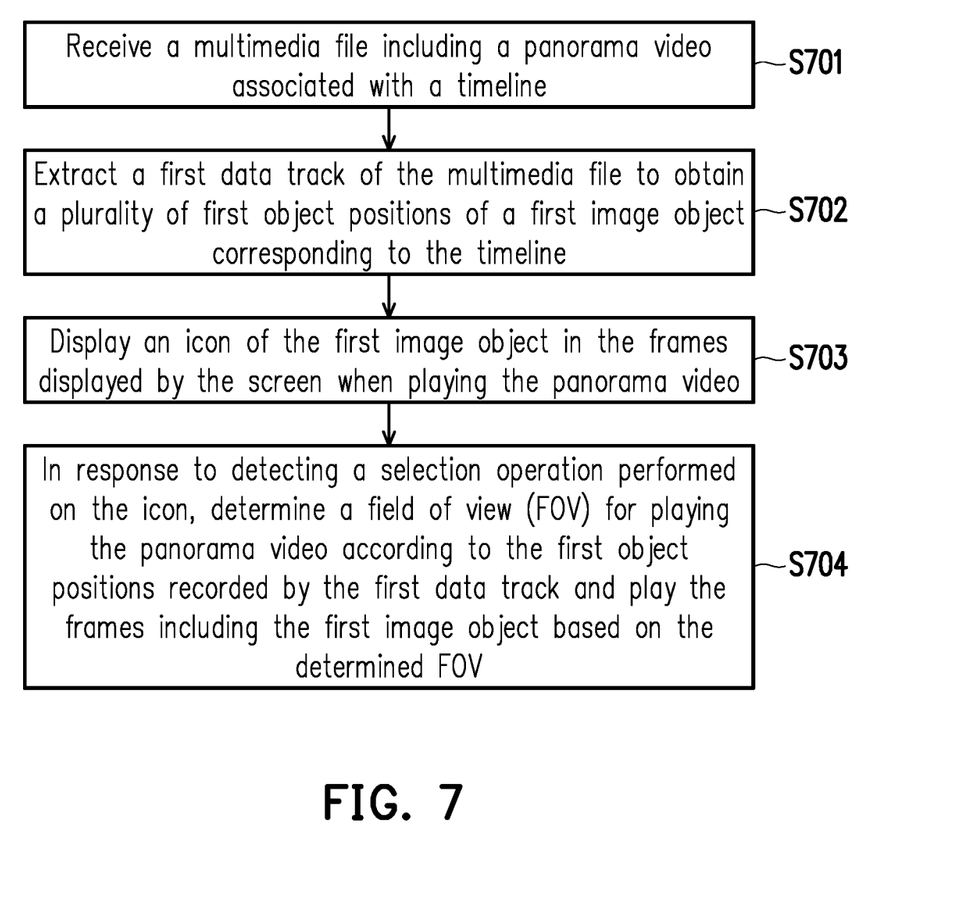
FIG. 7 is a flowchart illustrating a playing method of a multimedia file according to an embodiment of the disclosure.

FIG. 7 is a flowchart illustrating a playing method of a multimedia file according to an embodiment of the disclosure, where the flow in FIG. 7 may be implemented by the multimedia file playback apparatus 60 in FIG. 6. Referring to both FIG. 6 and FIG. 7, detailed steps of the playing method of multimedia file in this embodiment is described with reference to the components in the multimedia file playback apparatus 60 as follows.

In step S701, the video receiving module 621 may receive a multimedia file including a panorama video associated with a timeline. The video receiving module 621 may receive the multimedia file including the panorama video via wireless network or wired network, or may read the multimedia file from the storage device 620 or other external storage device. In step S702, the data track extracting module 622 may extract a first data track of the multimedia file to obtain a plurality of first object positions of a first image object corresponding to the timeline. The data track extracting module 622 may demultiplex the multimedia file to obtain multimedia data in each of the data tracks. In one embodiment, the data tracks of the multimedia file may include a video data track, an audio data track, a subtitle data track and an object position data track. The data track extracting module 622 may extract the multimedia data classified in the object position data track from the multimedia file, and the multimedia data classified in the object position data track includes a plurality of a first object positions of the first image object corresponding to the timeline in the panorama video. The object positions in the object position data track have been illustrated before and would not be describe again redundantly. Similarly, the data track extracting module 622 may also extract the video data classified in the video data track from the multimedia file, and may decode the video data to obtain the video frames of the panorama video.

Next, in step S703, the interface providing module 623 may display an icon of the first image object in the frames displayed by the screen 610 when playing the panorama video. That is, the interface providing module 623 may provide a user interface of the player which includes a frame display zone and a playback controlling bar. It should be noted that, the interface providing module 623 may be aware of the number of the image objects tagged previously in the video content of the panorama video by analyzing the number of the object position data track in the header (e.g. header 51 shown in FIG. 5) of the multimedia file. Hence, the interface providing module 623 may display the icons of the image objects tagged previously in the frames displayed by the screen 610 while playing the panorama video. The said icons may be an interactive object in any shapes, and the name or the representing pattern of the image objects may be shown in the icons, so as to immediately guide the user about key element of the panorama video. Further, each of the icons may be displayed at the edge of the playback frame or may be displayed in the playback controlling bar of the player.

Next, the processor 610 may continually detect whether the user selects any icons to detect a selection operation performed on one icon nu the user. Hence, in step S704, in response to detecting a selection operation performed on the icon, the video playback module determines a FOV for playing the panorama video according to the first object positions recorded by the first data track and plays the frames including the first image object based on the determined FOV. That is, when the user selects a icon corresponding to the first image object, the video playback module 624 may be aware of the current object position of the first image object in the panorama video from the object position data track. Afterward, the video playback module 624 may determine the FOV according to current object position of the first image object, and the display frame would be moved from a predetermined region to a first region where the first image object located in, such that the user may view the selected key object immediately.

It should be noted that, the first object position of the selected first image object may vary. Take FIG. 3B as example, the first object position of the first image object may be changed from (r4, θ4, ϕ4) to (r6, θ6, ϕ6). IF the FOV is not adjusted, the first image object may disappear from the display frame. In one embodiment, the video playback module 624 may switch the FOV according to the first object position which has been change in response to identifying a change of the first object positions.

Take FIG. 3B as example, in response to that the first object position of the first image object has been changed from (r4, θ4, φ4) into (r6, θ6, φ6), the video playback module 624 may switch the playback FOV from a first FOV to a second FOV. Accordingly, the display frame may be varied from the first region to the second region where the first image object located in. That is, the video playback module 624 may play the first region of the panorama video according to the first FOV within the time interval P1, and then play the second region of the panorama video according to the second FOV within the time interval P2. Such that, the user can continually view the selected object without manually adjusting the FOV.

It should be noted that, the number of the image objects may be two or more than two. In one embodiment, except for extracting a first data track of the multimedia file, the data track extracting module 622 may further extract a second data track of the multimedia file to obtain a plurality of second object positions of the second image object corresponding to the time line in the panorama video. Hence, when playing the panorama video, the interface providing module 623 may also display another icon corresponding to the second image object in the display frame displayed by the screen 610. Such that, in response to detecting a selection operation performed on the another icon, the video playback module 624 may switch the FOV according to the second object positions recorded by the second data track and plays the frames including the second image object based on the switched FOV.

Figure 8A:
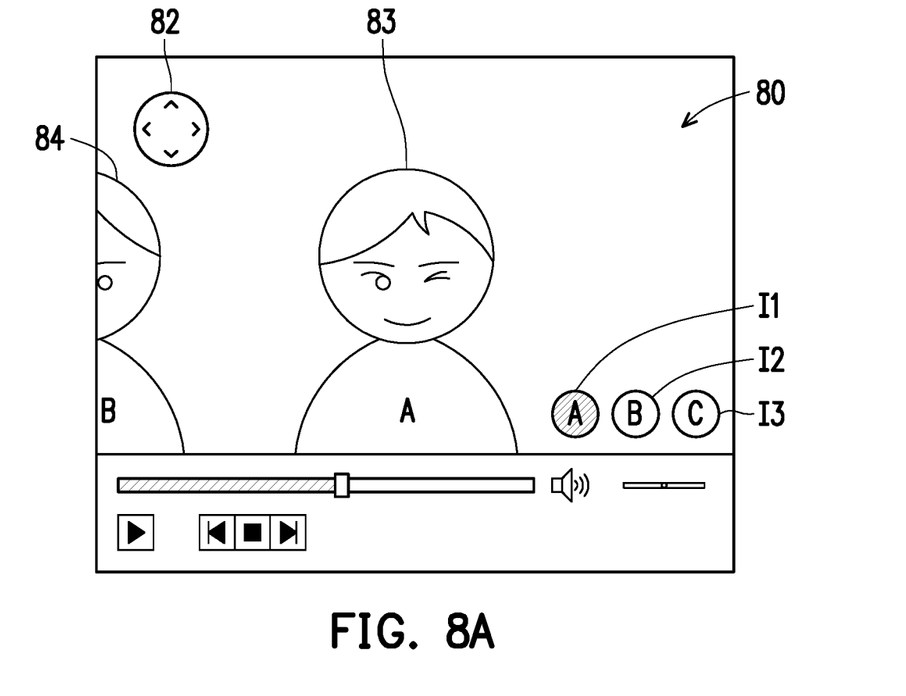
FIG. 8A and FIG. 8B are exemplary schematic diagrams of playing the multimedia file according to an embodiment of the disclosure.
Figure 8B:
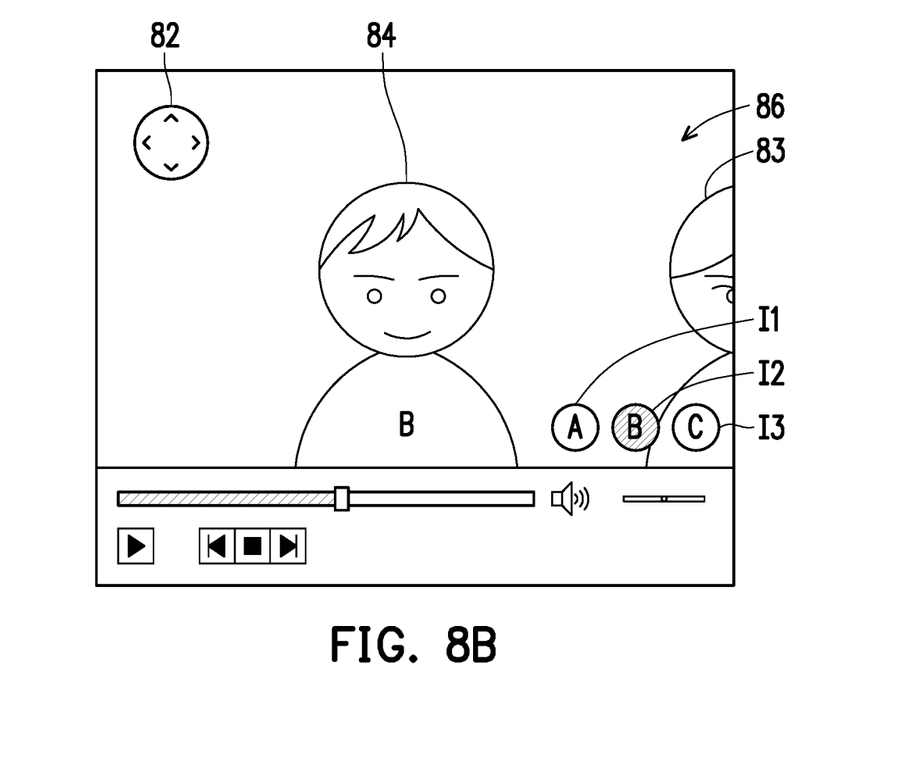

For example, FIG. 8A and FIG. 8B are exemplary schematic diagrams of playing the multimedia file according to an embodiment of the disclosure. Please referring to FIG. 8A, when the multimedia file playback apparatus 60 plays the multimedia file of the disclosure, the panorama video is played along with the timeline. The user can adjust the FOV for playing the panorama video by performing the operation on the virtual controlling button 82. The multimedia file playback apparatus 60 may obtain the description of the object position data track and the number of the object position data track from the header of the multimedia file, so as to be aware of the object name or the number of the image objects tagged previously. In the present example, assuming the number of the image objects tagged previously is 3, thus, the multimedia file playback apparatus 60 may display three icons I1-I3 in the frame 80 and the three icons I1-I3 respectively show the name 'A', 'B', 'C' of the three image objects.

Assuming the user wants to view the image object 83 (i.e. key person A) corresponding to the icon I1, the multimedia file playback apparatus 60 may determine the FOV for playing panorama video according to the object positions of the image object 83 recorded in the object position data track in response to detecting the selection operation performed on the icon I1 by the user, so as to play the frame 80 including the image object 83 according to the determined FOV. In the present example, the selected image object 83 is located in the middle of the frame 80. Afterward, assuming the user wants to view the image object 84 (i.e. key person B) corresponding to the icon I2, the multimedia file playback apparatus 60 may switch the FOV for playing panorama video according to the object positions of the image object 84 recorded in the object position data track in response to detecting the selection operation performed on the icon I2 by the user, so as to play the frame 86 including the image object 84 according to the switched FOV. In the present example, after switching the FOV, the selected image object 84 is located in the middle of the frame 86.

In summary, in the embodiments of the disclosure set above, the multimedia file including the panorama video further includes an object position data track for recording the position information of the image objects. The multimedia file generation apparatus embeds the object positions of the image object into the multimedia file, such that the multimedia file playback apparatus can obtain the object positions of a specific image object immediately while playing the panorama video. Based on above, the powerful computing capability for performing image object recognition and tracking is not necessary for the multimedia playback apparatus of the user. In addition, after the user selects an image object of interest, the multimedia file playback apparatus can adjust the FOV dynamically according to the object positions of the image object, to accomplish the playback function capable of tracking a specific image object. Therefore, the user may not need to adjust the FOV manually to view an image object of interest, such that the convenience of viewing the 360-degree panorama video is greatly upgrade. The disclosure would immediately guide the user about all key elements in a panorama video so that the user would be able to view the panoramic video in an intuitive and speedy manner.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A generating method of multimedia file, applicable to a multimedia file generation apparatus, and comprising:

obtaining a panorama video associated with a timeline, wherein the panorama video comprises at least one image object, the panorama video is composed of video frames respectively corresponding to different time stamps on the timeline;

obtaining a plurality of object positions of the at least one image object corresponding to the timeline, wherein the at least one image object comprises a first image object, the object positions corresponding to the timeline comprises a plurality of first object positions of the first image object, and the first object positions within different time zones are sampled according to a time interval;

manufacturing the object positions into an object position file; and generating at least one data track of a multimedia file according to the object position file to produce the multimedia file including the panorama video and recording the object positions, wherein the multimedia file comprises the at least one data track recording the object positions, wherein the multimedia file comprises a header and a plurality of data tracks, the data tracks comprise a video data track and at least one object position data track configured for recording the object positions, and the header records description of the at least one object position data track and the number of the at least one object position data track.

2. The generating method of multimedia file according to claim 1, wherein the at least one image object comprises a second image object, the object positions corresponding to the timeline comprises a plurality of second object positions of the second image object, and the step of generating the at least one data track of the multimedia file according to the object position file comprises:
 embedding the first object positions in the object position file into a first data track; and
 embedding the second object positions in the object position file into a second data track.

3. The generating method of multimedia file according to claim 1, wherein the object positions of the at least one image object respectively correspond to a plurality of time zones on the timeline.

4. The generating method of multimedia file according to claim 1, wherein the step of manufacturing the object positions into the object position fil comprises:
 mapping the object positions recorded as a plurality of stereo position coordinates into a plurality of two-dimension position coordinates, and recording the two-dimension position coordinates in the object position file.

5. A multimedia file generation apparatus, comprising:
 a storage device, recording a plurality of modules;
 a processor, coupled to the storage device, and configured to execute the modules to:
  obtain a panorama video associated with a timeline, wherein the panorama video comprises at least one image object, the panorama video is composed of video frames respectively corresponding to different time stamps on the timeline;
  obtain a plurality of object positions of the at least one image object corresponding to the timeline, wherein the at least one image object comprises a first image object, the object positions corresponding to the timeline comprises a plurality of first object positions of the first image object, and the first object positions within different time zones are sampled according to a time interval;
  manufacture the object positions into an object position file; and
  generate at least one data track of a multimedia file according to the object position file to produce the multimedia file including the panorama video and recording the object positions, wherein the multimedia file comprises the at least one data track recording the object positions,
 wherein the multimedia file comprises a header and a plurality of data tracks, the data tracks comprise a video data track and at least one object position data track configured for recording the object positions, and the header records description of the at least one object position data track and the number of the at least one object position data track.

6. The multimedia file generation apparatus according to claim 5, wherein the at least one image object comprises a second image object, the object positions corresponding to the timeline comprises a plurality of second object positions of the second image object,
 wherein the processor is configured to embed the first object positions in the object position file into a first data track and embed the second object positions in the object position file into a second data track.

7. The multimedia file generation apparatus according to claim 5, wherein the object positions of the at least one image object respectively correspond to a plurality of time zones on the timeline.

8. The multimedia file generation apparatus according to claim 5, wherein the processor is configured to map the object positions recorded as a plurality of stereo position coordinates into a plurality of two-dimension position coordinates, and to record the two-dimension position coordinates in the object position file.

9. A playing method of multimedia file, applicable to a multimedia file playback apparatus, and comprising:
 receiving a multimedia file comprising a panorama video associated with a timeline, the panorama video is composed of video frames respectively corresponding to different time stamps on the timeline;
 extracting a first data track of the multimedia file to obtain a plurality of first object positions of a first image object corresponding to the timeline, wherein the first object positions within different time zones are sampled according to a time interval;
 displaying an icon of the first image object in frames displayed by a screen when playing the panorama video; and
 in response to detecting a selection operation performed on the icon, determining a field of view (FOV) for playing the panorama video according to the first object positions recorded by the first data track and playing the frames including the first image object based on the determined FOV, wherein the multimedia file comprises the first data track recording the first object positions,
 wherein the multimedia file comprises a header and a plurality of data tracks, the data tracks comprise a video data track and at least one object position data track configured for recording the object positions, and the header records description of the at least one object position data track and the number of the at least one object position data track.

10. The playing method of multimedia file according to claim 9, wherein the step of in response to detecting the selection operation performed on the icon, determining the FOV for playing the panorama video according to the first object positions recorded by the first data track comprises:
 switching the FOV in response to identifying a change of the first object positions.

11. The playing method of multimedia file according to claim 9, further comprising:
 extracting a second data track of the multimedia file to obtain a plurality of second object positions of a second image object corresponding to the timeline; and
 displaying another icon of the second image object in the frames displayed by the screen when playing the panorama video.

12. The playing method of multimedia file according to claim 11, wherein the step of after the step of determining the FOV for playing the panorama video according to the first object positions recorded by the first data track in response to detecting the selection operation performed on the icon, the method further comprises:
 in response to detecting a selection operation performed on the another icon, switching the FOV according to the second object positions recorded by the second data track and playing the frames including the second image object based on the switched FOV.

13. A multimedia file playback apparatus, comprising:
 a screen;
 a storage device, recording a plurality of modules;
 a processor, coupled to the screen and the storage device, and configured to execute the modules to:
  receive a multimedia file comprising a panorama video associated with a timeline, the panorama video is composed of video frames respectively corresponding to different time stamps on the timeline;

extract a first data track of the multimedia file to obtain a plurality of first object positions of a first image object corresponding to the timeline, wherein the first object positions within different time zones are sampled according to a time interval;

display an icon of the first image object in frames displayed by the screen when playing the panorama video; and in response to detecting a selection operation performed on the icon, determine a field of view (FOV) for playing the panorama video according to the first object positions recorded by the first data track and play the frames including the first image object based on the determined FOV, wherein the multimedia file comprises the first data track recording the first object positions, wherein the multimedia file comprises a header and a plurality of data tracks, the data tracks comprise a video data track and at least one object position data track configured for recording the object positions, and the header records description of the at least one object position data track and the number of the at least one object position data track.

14. The multimedia file playback apparatus according to claim 13, wherein the processor is configured to switch the FOV in response to identifying a change of the first object positions.

15. The multimedia file playback apparatus according to claim 13, wherein the processor is configured to extract a second data track of the multimedia file to obtain a plurality of second object positions of a second image object corresponding to the timeline, and to display another icon of the second image object in the frames displayed by the screen when playing the panorama video.

16. The multimedia file playback apparatus according to claim 15, wherein in response to detecting a selection operation performed on the another icon, the processor is configured to switch the FOV according to the second object positions recorded by the second data track and to play the frames including the second image object based on the switched FOV.

* * * * *